United States Patent
Joly

(10) Patent No.: US 11,092,818 B2
(45) Date of Patent: Aug. 17, 2021

(54) DEVICE FOR DISPLAYING STEREOSCOPIC IMAGES

(71) Applicant: Commissariat a l'energie atomique et aux energies alternatives, Paris (FR)

(72) Inventor: Pierre Joly, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 62 days.

(21) Appl. No.: 16/722,098

(22) Filed: Dec. 20, 2019

(65) Prior Publication Data

US 2020/0201066 A1    Jun. 25, 2020

(30) Foreign Application Priority Data

Dec. 22, 2018 (FR) .................................... 18 74084

(51) Int. Cl.
*H04N 13/31* (2018.01)
*G02B 30/26* (2020.01)
(Continued)

(52) U.S. Cl.
CPC ........... *G02B 30/26* (2020.01); *H04N 13/106* (2018.05); *H04N 13/194* (2018.05); *H04N 13/31* (2018.05)

(58) Field of Classification Search
CPC ...... G02B 30/26; G02B 30/27; H04N 13/106; H04N 13/194; H04N 13/31
(Continued)

(56) References Cited

U.S. PATENT DOCUMENTS 5,991,073 A * 11/1999 Woodgate ............ H04N 13/368
359/462
6,118,584 A * 9/2000 Van Berkel .......... H04N 13/305
359/463
(Continued)

FOREIGN PATENT DOCUMENTS

WO    WO 2016/102338 A1    6/2016

OTHER PUBLICATIONS

French Preliminary Search dated Sep. 30, 2019 in French Application 18 74084 filed Dec. 22, 2018 (with English Translation of Categories of Cited Documents & Written Opinion), 9 pages.
(Continued)

*Primary Examiner* — Michael Lee
(74) *Attorney, Agent, or Firm* — Oblon, McClelland, Maier & Neustadt, L.L.P.

(57) ABSTRACT

Displaying device comprising an image medium formed from a matrix array of pixels that extend in rows, parallel to a first longitudinal axis, and in columns, parallel to a first lateral axis, the image medium being placed facing an optical array, wherein:
the image medium is segmented into elementary zones, each elementary zone being configured to display an elementary image;
the optical array comprises optical separating elements;
each elementary zone forms a matrix array, and comprises pixels, each pixel being associated with a rank;
the optical array is configured to form views in the image plane, each view being formed by a projection of pixels of the same rank, said pixels being located in various elementary zones;
the elementary zones are arranged in unit cells, each unit cell comprising a central elementary zone and four
(Continued)

elementary zones that are adjacent thereto, each unit cell being such that the centers of the adjacent elementary zones are staggered.

19 Claims, 7 Drawing Sheets

(51) Int. Cl.
*H04N 13/106* (2018.01)
*H04N 13/194* (2018.01)

(58) Field of Classification Search
USPC .......................................................... 348/59
See application file for complete search history.

(56) References Cited

U.S. PATENT DOCUMENTS

| | | | | |
|---|---|---|---|---|
| 9,645,401 | B2* | 5/2017 | Nishiwaki | G02B 3/0043 |
| 10,313,662 | B2* | 6/2019 | An | H04N 13/349 |
| 10,859,849 | B2* | 12/2020 | Jin | H04N 13/31 |
| 2002/0008674 | A1* | 1/2002 | Son | H04N 13/363 |
| | | | | 345/4 |
| 2011/0038043 | A1* | 2/2011 | Lin | G02B 30/27 |
| | | | | 359/463 |
| 2012/0280987 | A1* | 11/2012 | Iwane | G02B 30/27 |
| | | | | 345/419 |
| 2014/0118824 | A1 | 5/2014 | Hsieh et al. | |
| 2016/0077349 | A1* | 3/2016 | An | G02B 30/27 |
| | | | | 348/55 |
| 2016/0223825 | A1* | 8/2016 | Kroon | G02B 30/27 |
| 2017/0208319 | A1* | 7/2017 | Kim | H04N 13/305 |
| 2018/0011332 | A1 | 1/2018 | Vdovin et al. | |

OTHER PUBLICATIONS

Son, J-Y. et al., "Characteristics of pixel arrangements in various rhombuses for full-parallax three-dimensional image generation," Applied Optics, vol. 45, No. 12, Apr. 20, 2006, XP-001242825, 8 pages.

Tiziani, H. J., et al., "Three-dimensional image sensing by chromatic confocal microscopy," Applied Optics, vol. 33, No. 10, Apr. 1, 1994, 6 pages.

Waller, L. et al., "Phase from chromatic aberrations," Optics Express, vol. 18, No. 22, Oct. 25, 2010, 9 pages.

* cited by examiner

DEVICE FOR DISPLAYING STEREOSCOPIC IMAGES

TECHNICAL FIELD

The technical field of the invention is the display of a three-dimensional (3D) image, using a technique that allows a user to perceive two-dimensional images in 3D.

PRIOR ART

The principles of display of a three-dimensional image, or more precisely of an image perceived to be three-dimensional by the brain, have been understood for quite a long time. Among the first methods employed, those requiring use of specific glasses are quite commonplace. It is for example a question of glasses comprising color filters or polarizing filters. These glasses allow stereoscopic views of a scene to be formed.

Other systems, which are said to be autostereoscopic, allow a relief to be perceived using images generated by a displaying device. In this type of device, a screen is optically coupled to an optical separating element. The latter allows different views of a given scene to be projected onto the eyes of a user. The optical separating element may notably be a lenticular array. The screen is then coupled to convergent microlenses, which are spherical for example. The latter allow the light generated by the pixels of the screen to be deviated so as to form, on the eyes of a user, a pair of stereoscopic images. One view is formed in one eye, whereas another view is formed in another eye, the views thus formed forming the stereoscopic pair. Such devices, which are based on coupling between a screen and a microlens array, are for example described in EP0697161. The advantage of autostereoscopic displaying systems is that they do not require specific glasses to be used. The microlenses are assembled into an array of microlenses, or lenticular array usually known as 'microlens array'.

One constraint related to the use of microlenses, or other types of optical separating elements, is the appearance of moiré effects, which may lead to the appearance of interference fringes in the image seen by the user. This is due to the superposition of two periodic structures, namely the pixels of the screen and the microlens array. The publication Son J. Y "Characteristics of pixel arrangements in various rhombuses for full-parallax three-dimensional system"; Applied Optics, Vol. 45, No. 12, Apr. 2006, addresses this problem, and proposes an array of microlenses forming rhombi.

Another constraint related to the design of autostereoscopic displaying devices is the head box, the latter corresponding to all of the views simultaneously formed by the device. It is a question of a spatial zone in which the eyes of a user must be located for a three-dimensional image to be perceived. Generally, the head box describes a square, such that the maximum dimension, parallel to the interpupillary distance of an observer, is substantially equal to the maximum dimension perpendicular to the axis defining the interpupillary distance.

Document WO98/20392 describes use of a microlens array each lens of which is of triangular, rectangular or hexagonal shape, the hexagonal shape being presented as preferred. Specifically, the hexagonal shape is considered to have a favorable ratio between area and the distance separating the center of the hexagon and the furthest point of the hexagon. Thus, microlenses of hexagonal shape are assumed to provide a better optical performance, and in particular a large depth of field. The device described in this document allows a head box of rectangular shape, the length of which is much larger than its height, to be obtained.

The inventor has designed a displaying device allowing the head box to be optimized such that the latter is better suited to the range of spatial movement of the eyes of a user, while decreasing the risk of formation of moiré effects.

SUMMARY OF THE INVENTION

A first subject of the invention is a displaying device comprising an image medium formed from a matrix array of pixels, each pixel extending around a center, the matrix array being such that the centers of the pixels extend in rows, parallel to a first longitudinal axis, and in columns, parallel to a first lateral axis, the image medium being placed facing an optical array, the device being such that:

the image medium is segmented into elementary zones, a preset number of adjacent pixels corresponding to each elementary zone, each elementary zone being configured to display an elementary image;

the optical array comprises optical separating elements, each optical separating element being configured to project the pixels into an image plane, which is distant from the image medium and parallel to the latter;

each elementary zone forms a matrix subarray and comprises pixels, each pixel being associated with a rank corresponding to a position of the pixel in the matrix subarray;

the optical array is configured to form views in the image plane, each view being formed by projections of pixels of the same rank and located in various elementary zones;

each elementary zone extends around a center;

each optical separating element is associated with one elementary zone, and extends about an elementary center, each optical separating element being placed so as to define an optical axis, extending between the elementary center and the center of the elementary zone associated with the optical separating element;

the optical axes of the various optical separating elements converge on a given point of the image plane;

wherein:

each elementary zone extends over a length, parallel to the first longitudinal axis, and a height, parallel to the first lateral axis, the length being strictly larger than the height;

the elementary zones are arranged in unit cells, each unit cell comprising a central elementary zone and four elementary zones that are adjacent thereto, each unit cell being such that the centers of the elementary zones of a given unit cell are staggered.

Thus, the centers of the elementary zones of a given unit cell are arranged in a staggered arrangement the orientation of which is set by the first longitudinal axis and the first lateral axis.

By staggered what is meant is an arrangement of five centers, four centers being arranged at the vertices of a parallelogram the edges of which are parallel to the first lateral axis and/or the first longitudinal axis, the fifth center being placed at the center of the parallelogram. The parallelogram is for example a rectangle, and preferably a square. Preferably, the first longitudinal axis and the first lateral axis are perpendicular to each other. Thus, the parallelogram indicated above is a rectangle. It may also be a question of a square. The views may notably be aligned parallel to the first longitudinal axis and to the first lateral axis.

The number of pixels belonging to a given elementary zone is strictly higher than 2, and preferably higher than 10 or even higher than 100.

The image medium may be a screen, the pixels of which emit light. It may also be a question of a bill, poster or placard.

The device may comprise one of the following features, alone or in any technically producible combination:

Each elementary zone comprises more than 2 pixels, and preferably more than 5 or 10 pixels.

Each elementary zone is rectangular.

The centers of the pixels located on the periphery of each elementary zone are aligned with the outline of a parallelogram or of a rectangle.

Each optical separating element has a polygonal cross section, and in particular a square or rhombus or hexagonal cross section.

Each optical separating element has a cross section forming a rhombus or a square.

At least one diagonal of each optical separating element respectively extends parallel to the first longitudinal axis X or to the first lateral axis Y.

The borders of two adjacent optical separating elements are aligned parallel:
  to a second longitudinal axis, the second longitudinal axis making, in a plane defined by the first longitudinal axis and the first lateral axis, an acute angle to the first longitudinal axis;
  or to a second lateral axis, the second lateral axis making, in a plane defined by the first longitudinal axis and the first lateral axis, an acute angle to the first lateral axis.

Each optical separating element is a microlens, such that the optical array is a microlens array. The microlenses may then be contiguous to one another.

Each optical separating element is a square, such that the second longitudinal axis is inclined by 45° to the first longitudinal axis, and such that the second lateral axis is inclined by 45° to the first lateral axis. In other words, each optical separating element is a square the diagonals of which are respectively parallel to the first longitudinal axis and to the first lateral axis.

The device comprises an orientation sensor and a microprocessor in order to redefine the elementary zones depending on an orientation of the image medium.

Each optical separating element is an aperture formed in an opaque mask.

Each aperture is inscribed in a circle of a diameter smaller than or equal to 1 mm.

The device is such that the views respectively formed by the projection of the pixels of the elementary zones are adjacent and form a set of views, forming a head box, extending parallel to the image medium, in a rectangular area.

The set of views extends parallel to the first longitudinal axis, over a length and, along the first lateral axis, over a height, the height preferably being smaller than two thirds of the length.

The height of the set of views is preferably equal, to within less than ±20%, or even to within less than ±10%, to half its length, this being an advantageous configuration.

Another subject of the invention is a method for displaying a set of views on an image plane, using a displaying device according to the first subject of the invention, the method comprising generating an image on the image medium, the generated image being decomposed into elementary images, such that each elementary zone of the image medium generates an elementary image, so that each view, formed on the image plane, corresponds to the projection of pixels of same rank of each elementary zone.

The method may comprise the following features, alone or in any technically producible combination:

the pixels of a given elementary zone are configured to display the elementary image, corresponding to the elementary zone, with various brightnesses or various colors.

the distance between the image medium and the image plane is comprised between 30 cm and 3 meters.

all of the views extend, in a rectangle, parallel to the first longitudinal axis and to the first lateral axis. The rectangle may notably extend parallel to the first longitudinal axis, over a length, which is for example comprised between 70 mm and 200 mm. It may extend parallel to the first lateral axis, over a height that is smaller than two thirds of the length. The height may correspond to half of the length, to within ±20%, or even to within less than ±10%.

Other advantages and features will become more clearly apparent from the following description of particular embodiments of the invention, which are given by way of nonlimiting example, and illustrated in the figures listed below.

FIGURES

FIG. 1B is shown in an XY plane defined by the first longitudinal axis, and by a first lateral axis defining the height of the screen.

SUMMARY OF PARTICULAR EMBODIMENTS

FIGS. 1A to 1F schematically show a displaying device 1 according to the invention. The device comprises an image medium 10, taking the form of a matrix array of pixels $11_{i,j}$. In the examples described in this description, and nonlimitingly, the image medium is a screen 10. Other examples of image media are indicated at the end of the description. In this example, the pixels of the screen are square. In other examples, they may have other geometric shapes, and for example a rhombus shape, as shown in the embodiment described with reference to FIG. 6. The displaying device 1 also comprises an optical array 20, the latter being made up of optical separating elements $21_i$ that together form an assembly. Preferably, the optical separating elements $21_i$ are assembled in a regular pattern. The optical array comprises I optical separating elements, which are preferably identical, and joined to one another. I is a natural integer generally higher than 10000, or higher than $1 \times 10^6$ or higher than $1 \times 10^7$.

In the example shown in FIGS. 1A to 1F, the optical separating elements $21_i$ are microlenses, which form a microlens array (MLA). In other examples, the optical separating elements are apertures in an opaque mask, each aperture forming a diaphragm (or pinhole). Such a configuration is described with reference to FIG. 5.

The screen extends along a first longitudinal axis X, defining rows, and along a first lateral axis Y, defining columns. The first lateral axis Y is perpendicular to the first longitudinal axis X. The length of the screen, parallel to the axis X, is for example comprised between 10 cm and 2 m, or even more. The height of the screen, parallel to the axis Y, is for example comprised between 5 cm and 1.5 m, or even more. The screen 10 is preferably a rectangular shape.

The pixels of the screen are arranged in a matrix arrangement. Each pixel of the screen comprises a center. These centers of the pixels are aligned in rows, parallel to the first longitudinal axis X, and in columns, parallel to the first lateral axis Y. This alignment is also a feature of the embodiment shown in FIG. 6.

In one of the targeted applications, the screen is a screen of a touch-screen tablet. Its dimensions are for example 200×160 mm.

Figure 1A:
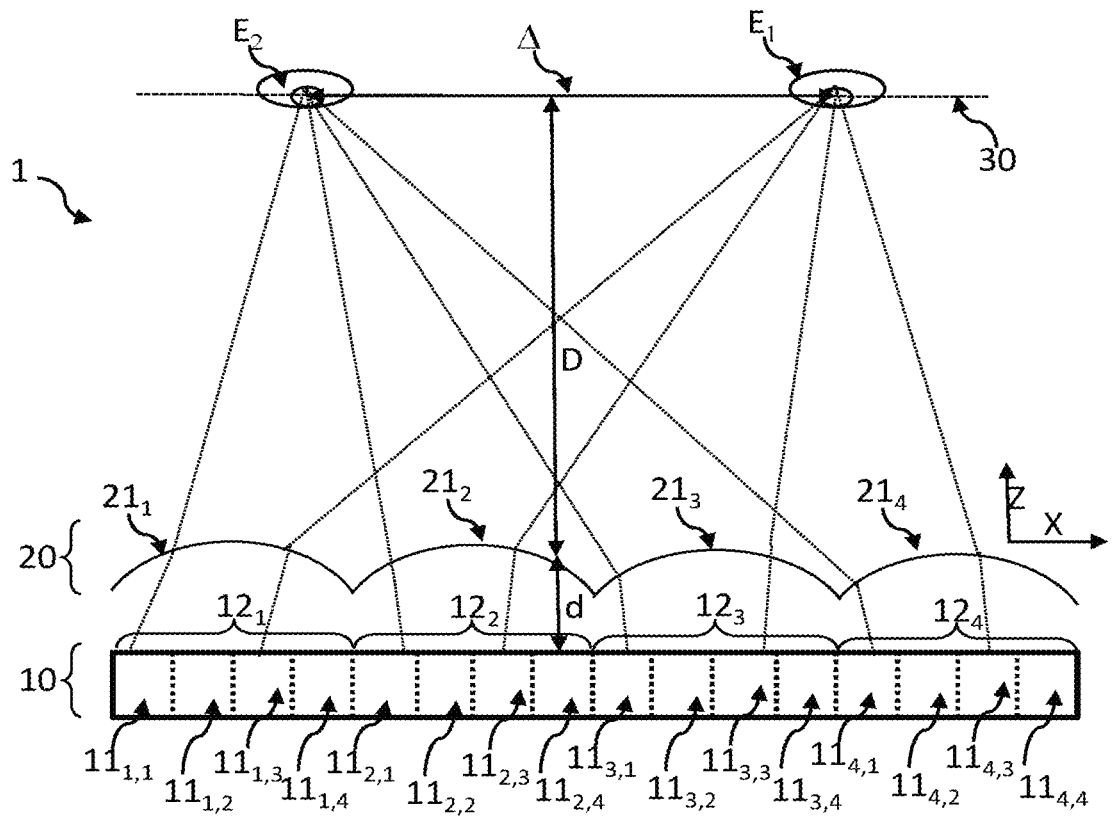
FIG. 1A is a schematic cross-sectional view of a portion of a device according to the invention, in an XZ plane defined by a first longitudinal axis, defining the length of a screen, and by a transverse axis, defining a distance between the screen and an image plane.

Conventionally, in the field of autostereoscopic screens, the pixels $11_{i,j}$ are assembled virtually into elementary zones $12_i$ of pixels, as shown in FIG. 1A. The screen 10 is thus segmented into I elementary zones $12_i$ with $1 \leq i \leq I$. An elementary zone $12_i$ contains a preset number J of adjacent pixels $11_{i,j}$. J is an integer strictly higher than 2, and preferably higher than 5 or than 10 or even higher than 500. For example, for a rectangular elementary zone two times wider than high, comprising n pixels heightwise, $J=2 \times n^2$
when n=5, J=50;
when n=20, J=800.

In the example shown in FIGS. 1A to 1F, each elementary zone contains 12 pixels $11_{i,j}$ arranged in 3 adjacent rows and 4 adjacent columns. It will be noted that each elementary zone $12_i$ of pixels $11_{i,j}$ is rectangular, the length, along the first longitudinal axis X, being larger than the height along the first lateral axis Y. When the image medium is a screen, each pixel $11_{i,j}$ may notably be a physical pixel, defined by electrodes, the physical pixel corresponding to an elementary display area of the screen, which area is configured to emit a luminous signal considered to be of uniform brightness. Generally, a pixel of an image is a point defining the spatial resolution of the image: it is a question of the smallest constituent element of an image that may be considered to be of uniform color.

Each elementary zone $12_i$ corresponds to a matrix subarray of the matrix array of pixels. It is intended to generate an elementary image. In each elementary zone, the pixels are assigned a rank j, the latter varying between 1 and J. Preferably, each elementary zone of the screen contains the same number J of pixels. In FIG. 1A, a row of screen containing 4 elementary zones $12_1$, $12_2$, $12_3$ et $12_4$ has been shown. In this row, the following feature:
the pixels $11_{1,1}$, $11_{1,2}$, $11_{1,3}$ et $11_{1,4}$ of the elementary zone $12_1$;
the pixels $11_{2,1}$, $11_{2,2}$, $11_{2,3}$ et $11_{2,4}$ of the elementary zone $12_2$;
the pixels $11_{3,1}$, $11_{3,2}$, $11_{3,3}$ et $11_{3,4}$ of the elementary zone $12_3$;
the pixels $11_{4,1}$, $11_{4,2}$, $11_{4,3}$ et $11_{4,4}$ of the elementary zone $12_4$.

Thus, the notation corresponds to a pixel of rank j in an elementary zone $12_i$ of index i.

Figure 1B:
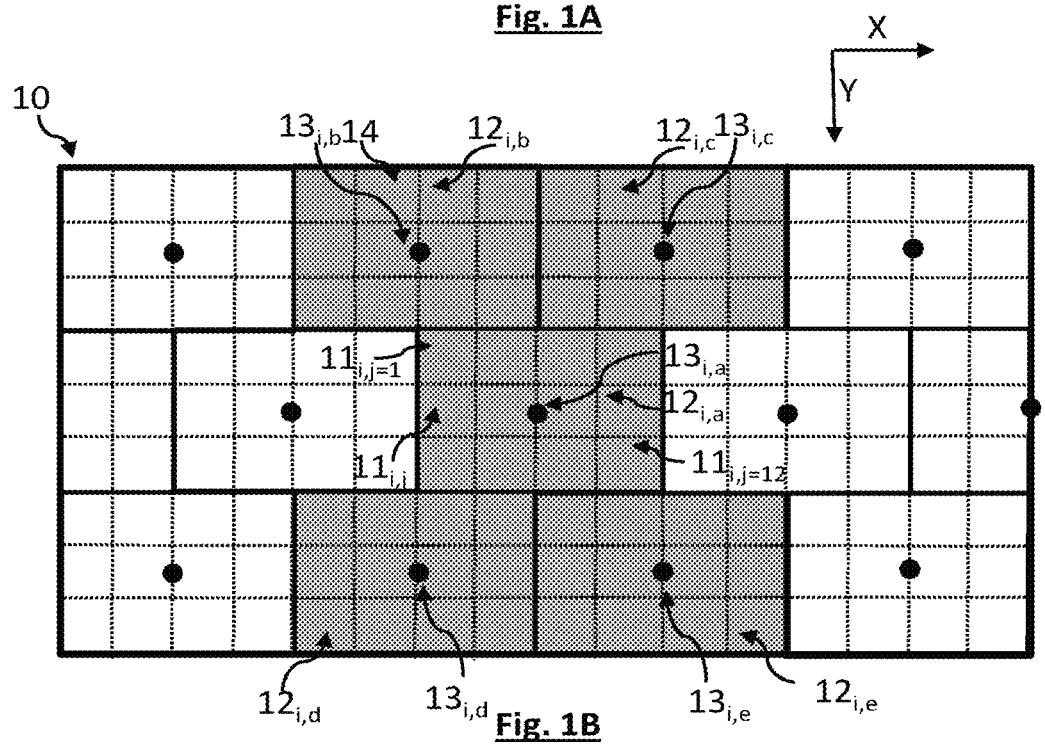
FIG. 1B is a view of one portion of the screen of the device shown in FIG. 1A.

The rank j of a pixel corresponds to the relative position of the pixel in the elementary zone $12i$ to which it belongs. Thus, in the example shown in FIGS. 1A to 1F, rank j=1 corresponds to the top-left position, whereas rank j=12 corresponds to the bottom-right position. This is illustrated in FIG. 1B.

The displaying device 1 is intended to be placed at a distance D from a user, along a transverse axis Z extending perpendicular to the screen 10. The eyes E1, E2 of the user are located in a plane 30, called the image plane, which extends parallel to the screen, along the axes X and Y.

Each optical separating element $21_i$ of the optical array 20 is placed facing the screen 10, at a distance d from the latter. Each optical separating element $21_i$ is assigned an index i, such that an optical separating element $21_i$ is placed facing an elementary zone $12_i$. Thus, each elementary zone $12_i$ is associated with an optical separating element $21_i$ facing it, as shown in FIGS. 1A and 1F.

Figure 1C:
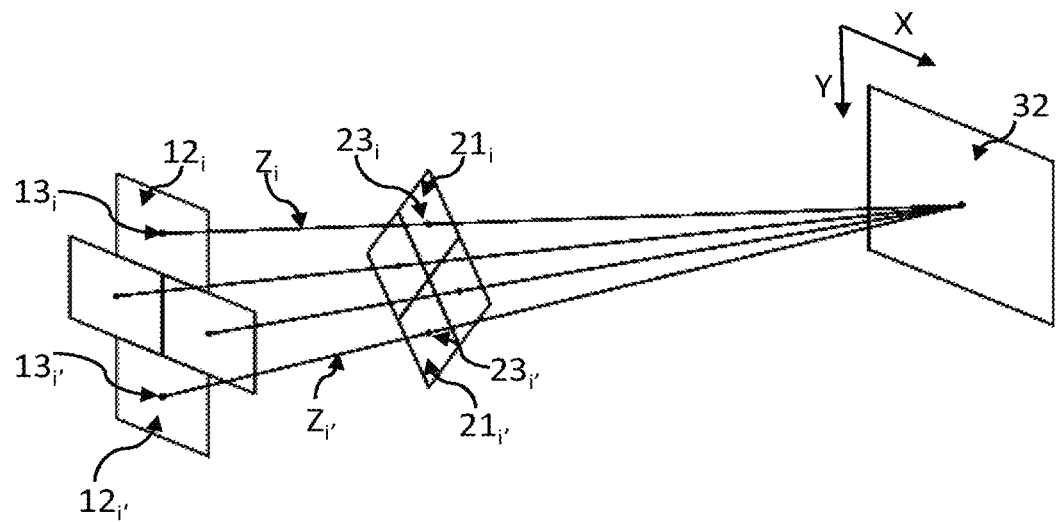
FIG. 1C illustrates a convergence of optical axes, each optical axis passing through the respective centers of one elementary zone and of one optical separating element that is associated therewith.
Figure 1D:
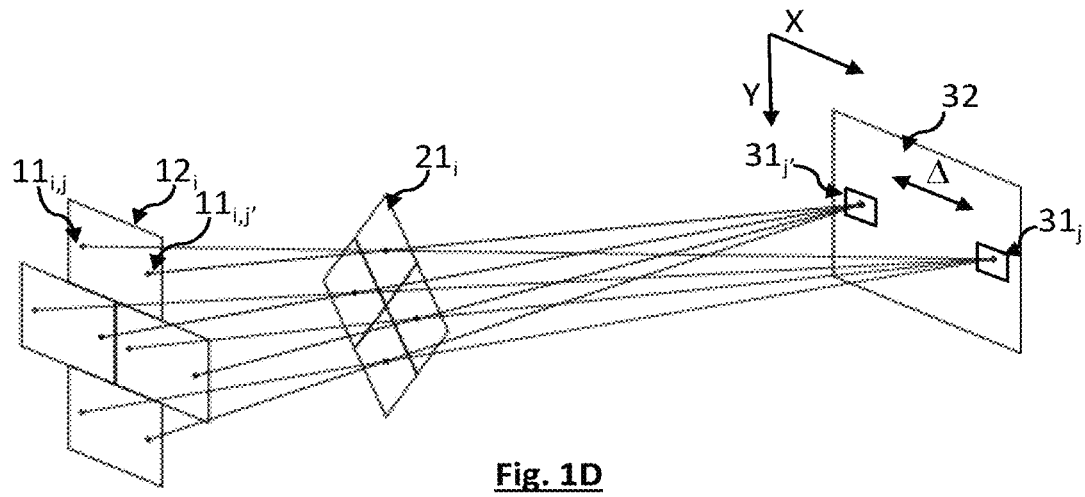
FIGS. 1D and 1E illustrate the formation of views, in an image plane, from a projection, by optical separating elements, of pixels located in various elementary zones.

As may be seen in FIGS. 1C and 1D, each optical separating element $21_i$ extends around an optical center $23_i$ or elementary center, located at the point of intersection of the diagonals thereof. Moreover, each elementary zone $12_i$ extends around a center $13_i$, defined by the point of intersection of the diagonals thereof. In FIG. 1B, the centers $13_i$ of each elementary zone $12_i$ have been shown. As shown in FIG. 1C, each optical separating element $21_i$ is centered with respect to the elementary zone $12_i$ with which it is associated. By centered, what is meant is that the respective centers $13_i$, $23_i$ of an elementary zone $12_i$ and of an optical separating element $21_i$ define an optical axis $Z_i$. In FIG. 1C, the intersection of a plurality of optical axes $Z_i$, $Z_{i'}$ respectively defined by the centers $13_i$, $13_{i'}$ of elementary zones $12_i$, $12_{i'}$ and by the elementary centers $23_i$, $23_{i'}$ of the optical separating elements $21_i$, $21_{i'}$ associated with said elementary zones have been shown. The optical axes $Z_i$ respectively associated with the various optical separating elements $21_i$ converge on the same point located in the image plane 30.

Figure 1E:
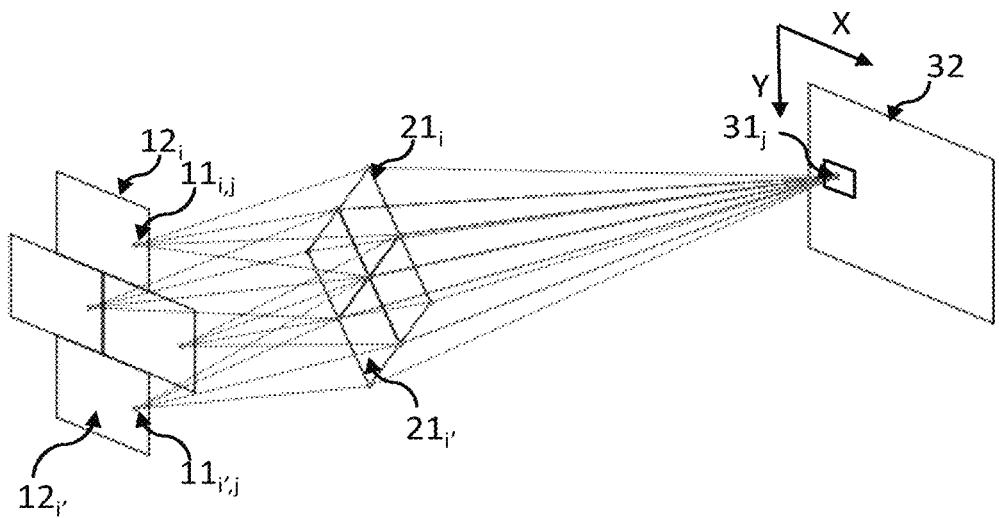
Figure 1F:
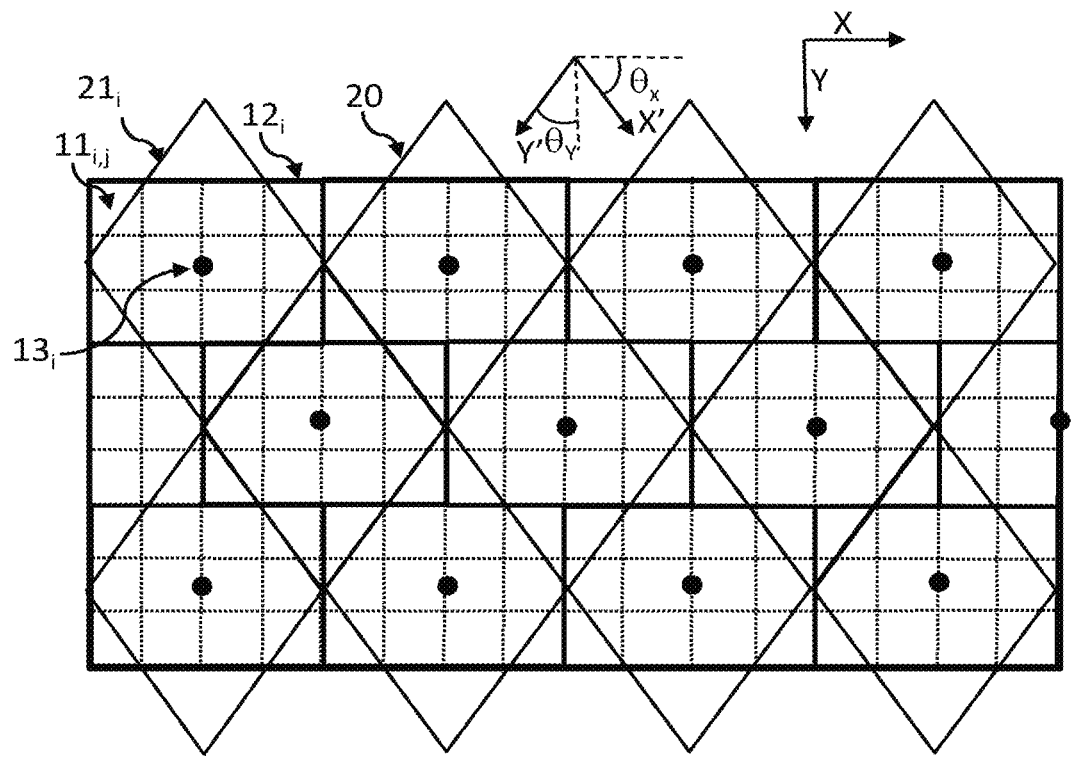
FIG. 1F illustrates the alignment of respective centers of elementary zones of the screen and of separating elements of an optical array of the device.

The function of an optical separating element $21_i$ is to optically project each pixel $11_{i,j}$ into the image plane 30, so as to form, in the latter, views $31_j$ that are adjacent to one another, such that each view corresponds to the superposition of the projections of the pixels $11_{i,j}$ of given rank j and coming from various elementary zones $12_i$ of the screen. In other words, the optical array 20 is configured such that each optical separating element $21_i$ respectively projects each pixel $11_{i,j}$ into a view $31_j$ of index j, j corresponding to the rank of the pixel in the elementary zone to which it belongs. In the example shown in FIGS. 1A and 1F, each optical separating element $21_i$ is a microlens, allowing each pixel $11_{i,j}$ of rank j to be conjugated with an elementary zone $21_i$ in a view $31_j$ of index j. FIG. 1E schematically shows a conjugation of pixels of same rank j and belonging to various elementary zones $12_i$, $12_{i'}$, . . . , this allowing a view $31_j$ to be formed.

The displaying device 1 thus allows J views $31_j$ to be simultaneously formed in the image plane, each view $31_j$ corresponding to an image formed by projecting the pixels $11_{i,j}$ of the same rank j of each elementary image formed in an elementary zone $12_i$. If I is the number of elementary zones $12_i$ into which the screen 10 is segmented, said zones each respectively being associated with one elementary optical separating element $21_i$, I also corresponds to the number of pixels respectively conjugated with each view.

As shown in FIG. 1D, when the eyes E1, E2 of an observer are placed facing the displaying device 1, in the image plane 30, the size of the views $31_j$ is dimensioned such that the first eye E1 sees a view $31_j$, whereas the second eye E2 sees a view $31_{j'}$, with j'≠ j. Advantageously, the size of a view is inscribed in a diameter corresponding to the diameter of the pupil of an eye. It is therefore inscribed in a diameter smaller than 5 mm, and preferably smaller than 3 mm. According to the principles of stereoscopic vision, the view $31_j$ is different from the view $31_{j'}$. For example, at least two pixels $21_{i,j}$, $21_{i,j'}$, respectively forming each view, and comprised in the same elementary zone $12_i$, emit light in different spectral bands. Thus, the two eyes E1 and E2 of the observer see a different view, this allowing a perception of three-dimensional vision to be obtained. For the observer, each optical separating element (in the present case each microlens) forms one pixel of one view $31_j$, which he perceives with one eye. It will be understood that the spatial resolution of each view $31_j$ depends on the size of each optical separating element. The spatial resolution of each view is therefore better when the optical separating elements are small. However, each optical separating element $21_i$ must be able to project a high number of pixels $11_{i,j}$ of a given elementary zone $12_i$ so as to form J different views $31_j$. The size of each optical separating element is therefore a compromise between the spatial resolution of each view $31_j$ and the number J of different views formed in the image plane 30.

According to one example, the pixels $11_{i,j}$ of a given elementary zone $12_i$ emit light with a different brightness or a different color, whereas the pixels $11_{i,j}$ with 1≤i≤I of the same rank j forming a given view $31_j$ emit light with the same brightness or the same color.

It will be understood from the above that the number of views $31_j$ depends on the number of pixels of each elementary zone $12_i$. Thus, when each elementary zone contains $J_x$ pixels along the axis X and $J_y$ pixels along the axis Y, the displaying device allows $J_x$ views to be formed along the axis X and $J_y$ views to be formed along the axis Y, with $J_x \times J_y = J$. In the example described with reference to FIGS. 1A to 1F, the device allows 12 views $31_j$ (J=12) that are adjacent to one another and that are arranged in 4 rows and 3 columns to be obtained.

It will be noted that the invention allows a set of views 32 of rectangular shape to be obtained when the axis X is perpendicular to the axis Y. More generally, the set of views is parallel to the first longitudinal axis and to the first lateral axis. This set of views forms the head box of the displaying device 1, i.e. the field of observation in which an observer may perceive 3D information via the formed views. In the image plane 30, the views $31_j$ are adjacent to one another and form the head box 32, or field of visibility. The head box is homothetic to each elementary zone. In the example shown in FIGS. 1A to 1F, the head box is rectangular. Its length, along the first longitudinal axis X, is larger than its height along the first lateral axis Y. Now, the device is designed so that the axis Δ connecting the eyes E1 E2 of the observer is preferably parallel to the first longitudinal axis X. The respective positions of the eyes E1 and E2 of the user are more likely to move parallel to the axis X, than parallel to the axis Y. Specifically, the range of observation of a user is greater when the user turns his head parallel to the axis Δ, than perpendicular to the axis Δ. Thus, the invention allows the number of views formed along the axis X to be maximized with respect to the number of views formed parallel to the axis Y. Employing rectangular elementary zones $12_i$ therefore allows the shape of the head box, i.e. the useful observation field 32, formed by the displaying device 1 in the image plane 30 to be optimized.

The distance between the pupils of an observer, or interpupillary distance, is generally close to 65 mm. The inventor believed that the optimal shape of the head box might be a rectangle of 130 mm length along the axis X and of 65 mm height along the axis Y, or more generally a rectangle the height of which (along the axis Y) is smaller than ⅔ of its length (along the axis X). It appears optimal for the height to be substantially equal to half the length, the term substantially meaning to within 10% or to within 20%.

As described above, the number J of pixels in an elementary zone $12_i$ corresponds to the number of views $31_j$ formed in the image plane. It also corresponds to a ratio between the area of the head box 32 on the area of each elementary view. Since the number of pixels of the screen is limited, it is important to optimize the number of views formed, taking into account potential movements of the eyes of a user. A configuration based on rectangular elementary zones $12_i$ allows the spatial distribution of the views to be optimized, taking into account the fact that the movement of the eyes of an observer occurs predominantly parallel to the axis Δ, i.e. from right to left (or left to right) than perpendicular to the latter, i.e. from up to down or down to up.

In order to prevent the formation of moiré effects, the optical separating elements $21_i$ are aligned along a second longitudinal axis X' and a second lateral axis Y' that are respectively not parallel to the first longitudinal axis X and to the first lateral axis Y defined by the screen 10. More precisely, the optical separating elements $21_i$ are arranged such that borders of two adjacent optical separating elements are aligned parallel to the second longitudinal axis X' or to the second lateral axis Y', as may be seen in FIG. 1F. This figure shows the screen 10 and the optical array 20, seen from the point of convergence of the various optical axes $Z_i$, $Z_{i'}$ described with reference to FIG. 1C. In the shown example, the optical separating elements have a rhombus shape, the diagonals of which are respectively parallel to the first longitudinal axis X and to the first lateral axis Y of the matrix array of pixels forming the screen. The fact that the optical separating elements $21_i$ are rhombi is a preferred embodiment. The optical separating elements $21_i$ are preferably oriented such that two borders of two adjacent optical separating elements are aligned along:

a second longitudinal axis X' making an acute angle $\theta_X$, and for example an angle comprised between 10° and 80°, to the first longitudinal axis X;

or a second lateral axis Y' making an acute angle $\theta_Y$, and for example an angle comprised between 10° and 80°, to the first lateral axis Y.

An important element of the invention is the arrangement of the elementary zones $12_i$ of the screen. This arrangement must meet various conditions:

each center $13_i$ of an elementary zone $12_i$ defines an axis $Z_i$ with the center $23_i$ of the optical separating element $21_i$ that is associated therewith, the axes $Z_i$ of the elementary zones converging on the same point in the image plane P;

each elementary zone $12_i$ is of rectangular shape;
borders of the optical separating elements are aligned along axes X', Y' that are not parallel to the axes X, Y defined by the screen.

It is optimal for the elementary zones $12_i$ to be arranged like bricks in a wall. This is achieved by placing the respective centers of the elementary zones in a staggered pattern. Thus, it is possible to define a unit cell 14 of five elementary zones $12_i$, the respective centers $13_{i,a}$, $13_{i,b}$, $13_{i,c}$ $13_{i,d}$ and $13_{i,e}$ of which are arranged staggered. The unit cell 14 comprises a central elementary zone $12_{i,a}$, of center $13_{i,a}$ and four adjacent elementary zones $12_{i,b}$, $12_{i,c}$ $12_{i,d}$ and $12_{i,e}$, of respective centers $13_{i,b}$, $13_{i,c}$ $13_{i,d}$ and $13_{i,e}$, said centers being aligned, pairwise, in adjacent rows that are respectively on either side of the central elementary zone. The staggered arrangement is characterized by the fact that the centers $13_{i,b}$, $13_{i,c}$ $13_{i,d}$ and $13_{i,e}$ of the adjacent elementary zones $12_{i,b}$, $12_{i,c}$ $12_{i,d}$ and $12_{i,e}$ form the vertices of a parallelogram, whereas the center $13_{i,a}$ of the central elementary zone $12_{i,a}$ is placed at the center of the parallelogram. Depending on the relative orientation of the first longitudinal axis X and of the first lateral axis Y, the parallelogram may be a rectangle, or even a square. An elementary unit cell 14 is shown in grey in FIG. 1B, and in FIGS. 2A, 2B and 4. The staggered arrangement facilitates arrangement of the optical separating elements $21_i$. This makes centering each optical separating element $21_i$ facing the elementary zone $12_i$ with which it is associated easier. The optical array 20 may then comprise optical separating elements $21_i$ arranged in a regular pattern. The staggered arrangement is particularly suitable for the embodiment described with reference to FIGS. 2A and 2B.

Figure 2A:
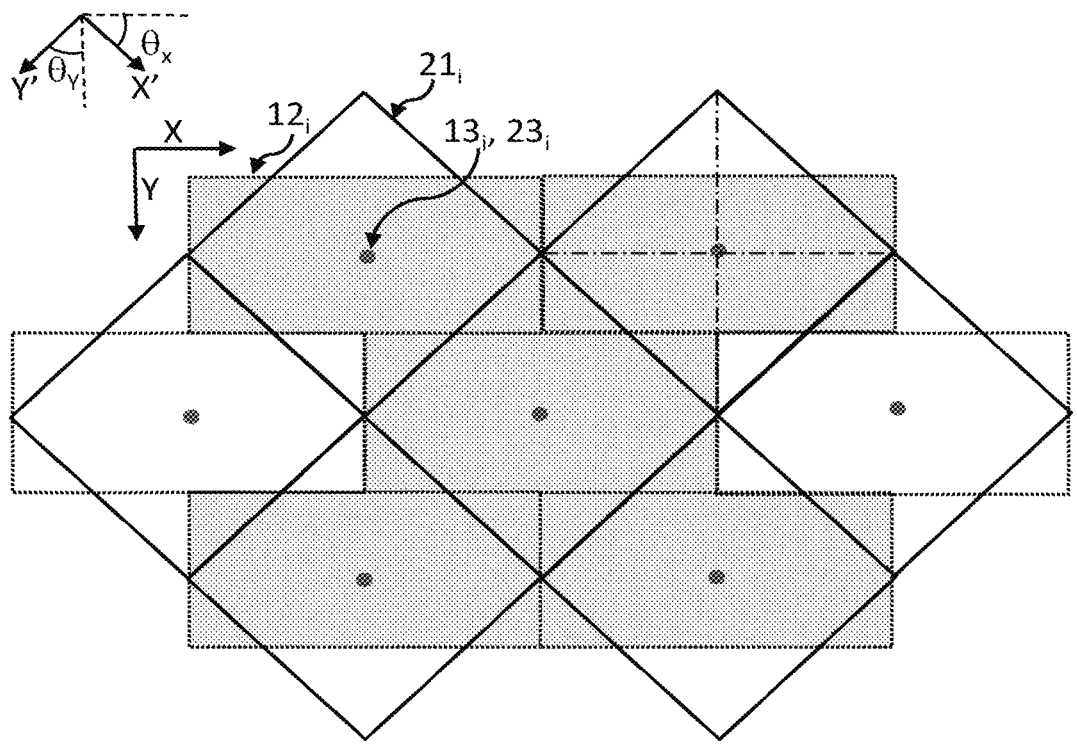
FIGS. 2A and 2B illustrate one preferred embodiment in which each optical separating element is a square.
Figure 2B:
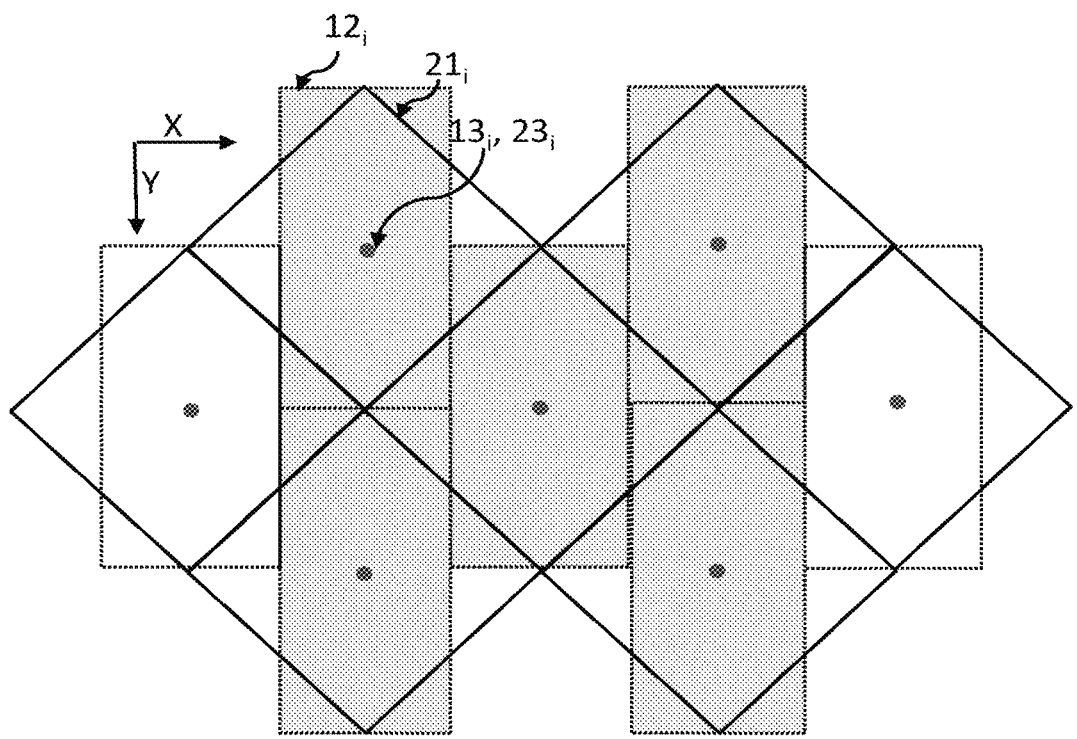

FIGS. 2A and 2B show one preferred embodiment of the invention. Each optical separating element $21_i$ has a square shape, this being a particular case of a rhombus shape. In FIG. 2A, as indicated above, the diagonals of each optical separating element $21_i$ are respectively parallel to the first longitudinal axis X and to the first lateral axis Y. In FIG. 2A, the two diagonals of an optical separating element have been shown with dash-dotted lines. The borders of two adjacent optical separating elements are aligned along:
a second longitudinal axis X' making to the axis X an acute angle $\theta_X$ that is substantially equal to 45°;
or a second lateral axis Y' making to the axis Y an acute angle $\theta_Y$ that is substantially equal to 45°.

The expression substantially equal means equal to within an angular tolerance for example of ±5°.

Such a configuration allows elementary zones the length of which (parallel to the axis X) is two times larger than their height (parallel to the axis Y). The length of each elementary zone $12_i$ corresponds, to within a homothetic factor, to a diagonal of the square forming the optical separating element $21_i$ with which it is associated. This also allows a head box 32 to be obtained the length of which is two times larger than its height. The inventor considered such a ratio to be particularly suitable for a use in which the screen is the screen of a tablet computer or a television set.

Another advantage of this configuration is that when the screen is pivoted by an angle of 90°, the elementary zones $12_i$ may be reconfigured, as is shown in FIG. 2B. The reconfiguration allows a head box 32 the height of which (in this configuration, along the axis X) is two times larger than its length (along the axis Y) to be maintained. The ability to pivot the screen by 90° may be a useful functionality when the latter is the screen of a tablet computer held in the hands of the user. In this case, the tablet computer comprises a processing unit connected to an orientation sensor in order to allow the elementary zones to be configured depending on the orientation of the screen.

The inventor has dimensioned an example of a displaying device in which the optical separating elements are square microlenses, as shown in FIG. 2A. This displaying device allows a head box of rectangular shape, of length $\Delta x=90$ mm and of height $\Delta y=45$ mm, to be obtained. The set of views 32 contains $J_x=38$ views in the longitudinal direction X and $J_y=19$ views along the axis Y. Each view is a square of 2.7 mm along the axis X and 2.7 mm along the axis Y.

Figure 3A:
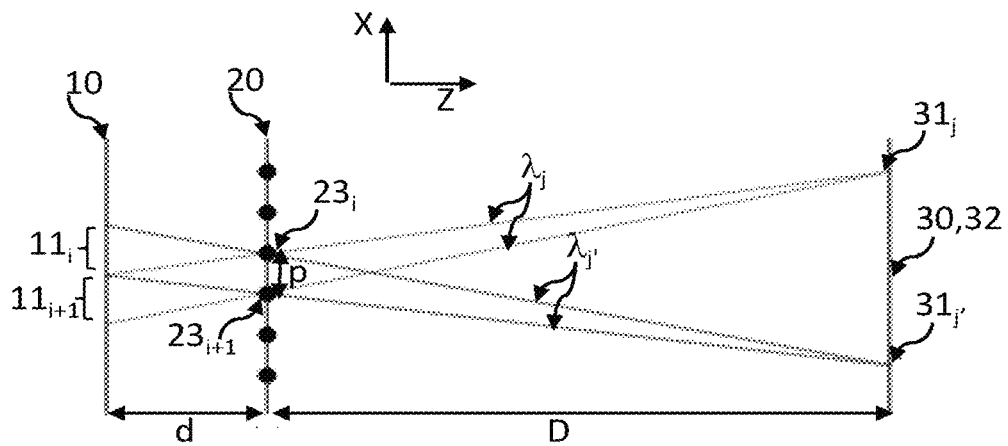
FIGS. 3A and 3B illustrate dimensioning parameters of a displaying device.
Figure 3B:
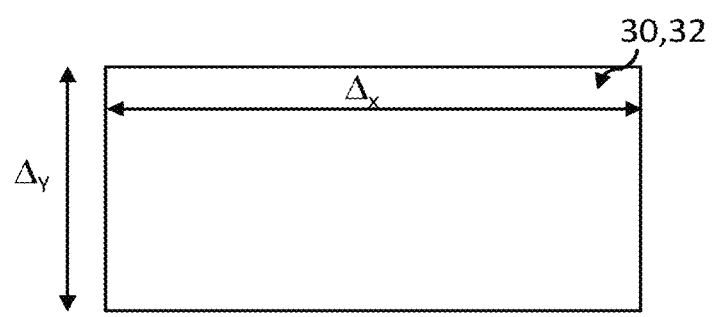

Consider a rectangular screen 10 of 200 mm×160 mm size and an optical array 20 of same size. The optical array 20 is formed by square microlenses of 350 µm side length forming a microlens array. Each lens is arranged such that its diagonals are respectively parallel to the first longitudinal axis X and to the first lateral axis Y of the screen. Two centers $23_i$, $23_{i+1}$ of two adjacent microlenses are spaced apart by a pitch p=495 µm. The focal length f of each lens is equal to $D/\Delta x=500/90=2.75$ mm. See FIGS. 3A and 3B.

The distance D between the observer, i.e. the image plane 30, and the microlens array 20 is set to 500 mm.

The distanced between the microlens array 20 and the screen 10 is computed using the equation:

$$x = f\left(1 + \frac{f}{D-f}\right) = 2.76 \text{ mm}$$

The magnification between all of the views 32 considered together (headbox) and the screen is:

$$g = \frac{D}{x} = 180$$

The pitch of the pixels on the screen is therefore 2.37/g=13.1 µm.

Taking into account the dimensions of the screen, this assumes 15267 pixels in the direction X and 12213 pixels in the direction Y, i.e. 186 445 871 pixels. Such a screen is produced by associating 36 micro-screens in a matrix array of 6 rows and 6 columns.

The preceding examples, the lenses $21_i$ are rhombi, a square being a particular case of a rhombus.

Figure 4:
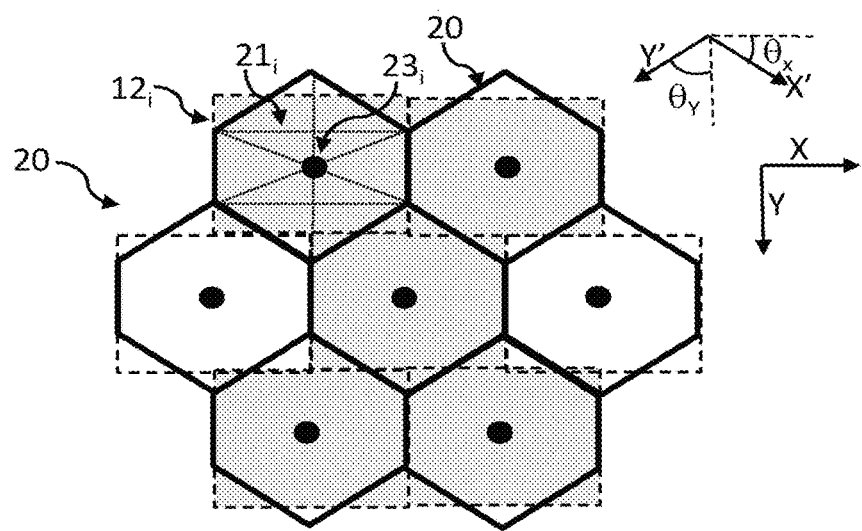
FIG. 4 shows one variant, in which each optical separating element is of hexagonal shape.

According to other embodiments, the lenses, or more generally the optical separating elements $21_i$, may have a hexagonal shape, as illustrated in FIG. 4.

When an optical separating element has a hexagonal shape, the center of the optical separating element corresponds to the intersection of at least three diagonals, the intersection not being coincident with a vertex of the hexagon. In FIG. 4, three diagonals of a hexagon the intersection of which is common and not coincident with a vertex have been shown by dotted lines. In FIG. 4, elementary zones $12_i$ of the screen have been shown by dashed lines. The hexagon is preferably a regular hexagon. When an optical separating element $21_i$ has a hexagonal shape, at least one diagonal of the optical separating element is preferably parallel to the first longitudinal axis X or to the first lateral axis Y. Preferably, the optical separating element has two diagonals that are respectively parallel to the longitudinal axis X and to the lateral axis Y. In FIG. 4, diagonals that are respectively parallel to the axis X and the axis Y have also been shown in by dotted lines.

Figure 5:
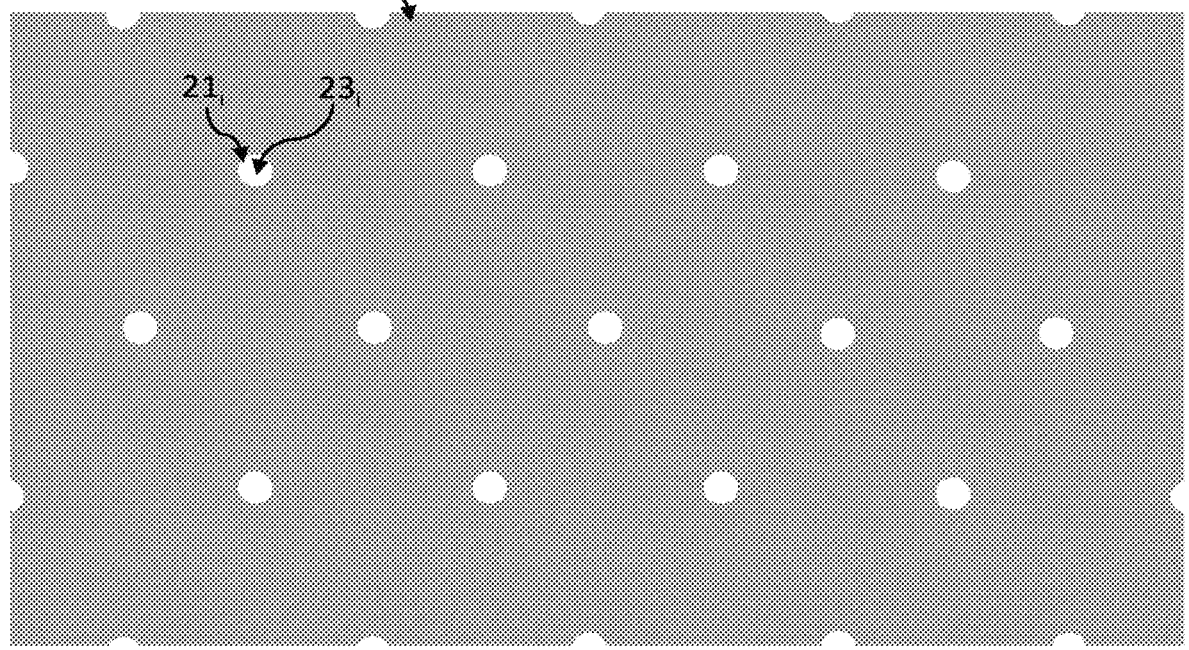
FIG. 5 shows a variant in which each optical separating element is an aperture in an opaque mask.

According to another embodiment, the optical array 20 consists of an opaque mask containing apertures $21_i$, the center $23_i$ of which is aligned with respect to the center $13_i$ of one elementary zone $12_i$. Each aperture forms an optical separating element $21_i$ of diaphragm or pinhole type. The size and spacing of the apertures depends on the distance D between the user and the optical array 20. It is preferable for the angular separation between two adjacent apertures to be smaller than 1 mrad (milliradian). It is preferable for the diameter of each aperture to be at least 5 times smaller than the spacing between the holes. Such an optical array 20 has an infinite depth of field, but the amount of light projected onto the image plane 30 is lower than when a microlens array is used. Such an optical array is shown in FIG. 5. The efficiency with which light is collected may be increased by placing a microlens level with each aperture. The optical array then comprises microlenses that are a distance apart from one another.

Figure 6:
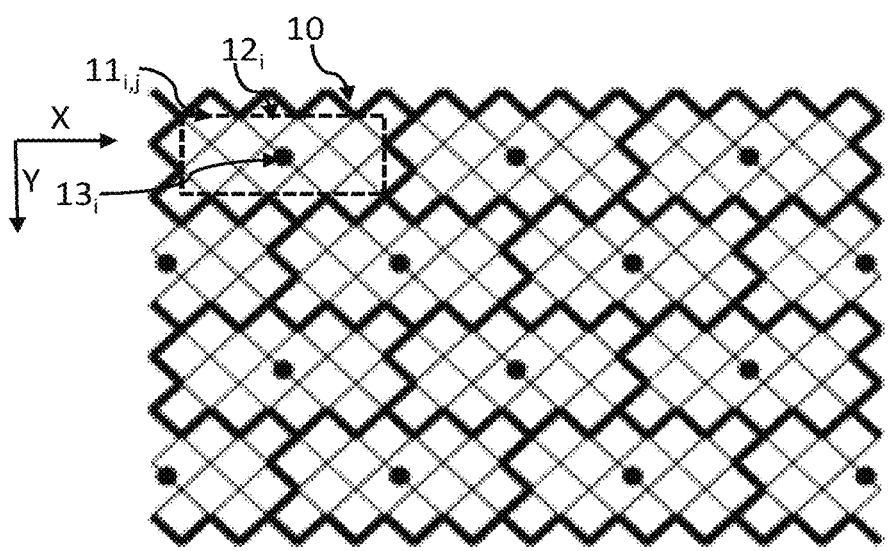
FIG. 6 illustrates a screen the pixels of which have a rhombus shape.

According to an embodiment, shown in FIG. 6, the pixels $11_{i,j}$ of the screen are inscribed in rhombi that are aligned along the first longitudinal axis X and along the first lateral axis Y. In such a configuration, each elementary zone $12_i$ comprises peripheral pixels, the respective centers of which are aligned with the outline of a rectangle. Such a rectangle has been shown by dashed lines in FIG. 6.

Although described with reference to a screen of a portable tablet computer, the invention may be applied to devices of larger size, for example television or cinema screens. The length of the screen, along the longitudinal axis X, may then exceed 1 meter, or even 10 meters, the height being adjusted depending on the format of the screen.

Moreover, in the examples discussed above, a screen forming an image medium was described. In other embodiments, the image medium may be any means allowing an image to be displayed. It may be a question of a printed sheet, a poster for example, or of a screen that receives an image projected by a projector. In this case, the pixels may be very small in size, for example smaller than 1 µm² in size. It may also be a question of a medium to which a coating, for example a coat of paint, has been applied. In this case, the medium may be a wall, or a surface of an everyday object (a decorative object for example) or a sign.

The invention claimed is:

1. A displaying device comprising an image medium formed from a matrix array of pixels, each pixel extending around a center, the matrix array being such that the centers of the pixels extend in rows, parallel to a first longitudinal axis, and in columns, parallel to a first lateral axis, the image medium being placed facing an optical array, the device being such that:
the image medium is segmented into elementary zones, a preset number of adjacent pixels corresponding to each elementary zone, each elementary zone being configured to display an elementary image;
the optical array comprises optical separating elements, each optical separating element being configured to project the pixels into an image plane, which is distant from the image medium and parallel to the latter;
each elementary zone forms a matrix subarray and comprises pixels, each pixel being associated with a rank corresponding to a position of the pixel in the matrix subarray;
the optical array is configured to form views in the image plane, each view being formed by projections of pixels of the same rank and located in various elementary zones;
each elementary zone extends around a center;
each optical separating element is associated with one elementary zone, and extends about an elementary center, each optical separating element being placed so as to define an optical axis, extending between the elementary center and the center of the elementary zone associated with the optical separating element;
the optical axes of the various optical separating elements converge on a given point of the image plane;
wherein:
each elementary zone extends over a length, parallel to the first longitudinal axis, and a height, parallel to the first lateral axis, the length being strictly larger than the height;
the elementary zones are arranged in unit cells, each unit cell comprising a central elementary zone and four elementary zones that are adjacent thereto, each unit cell being such that the centers of the elementary zones of a given unit cell are staggered.

2. The device of claim 1, wherein each elementary zone comprises more than 2 pixels, and preferably more than 5 or 10 pixels.

3. The device of claim 1, wherein each elementary zone is rectangular and/or wherein the centers of the pixels located on the periphery of each elementary zone are aligned with the outline of a rectangle.

4. The device of claim 1, wherein each optical separating element has a polygonal cross section, and in particular a square or rhombus or hexagonal cross section.

5. The device of claim 4, wherein each optical separating element has a cross section forming a rhombus or a square.

6. The device of claim 4, wherein at least one diagonal of each optical separating element respectively extends parallel to the first longitudinal axis or to the first lateral axis.

7. The device of claim 1, wherein borders of two adjacent optical separating elements are aligned parallel:
to a second longitudinal axis, the second longitudinal axis making, in a plane defined by the first longitudinal axis and the first lateral axis, an acute angle to the first longitudinal axis;
or to a second lateral axis, the second lateral axis making, in a plane defined by the first longitudinal axis and the first lateral axis, an acute angle to the first lateral axis.

8. The device of claim 1, wherein each optical separating element is a microlens, such that the optical array is a microlens array.

9. The device of claim 7 wherein:
each optical separating element is a microlens, such that the optical array is a microlens array;
each optical separating element is a square, such that the second longitudinal axis is inclined by 45° to the first longitudinal axis, and such that the second lateral axis is inclined by 45° to the first lateral axis.

10. The device of claim 1, wherein each optical separating element is an aperture formed in an opaque mask.

11. The device of claim 10, wherein each aperture is inscribed in a circle of a diameter smaller than or equal to 1 mm.

12. The device of claim 1, wherein the views respectively formed by the projection of the pixels of the elementary zones are adjacent and form a set of views, forming a head box, extending parallel to the image medium, in a rectangular area.

13. The device of claim 12, configured such that the set of views extends parallel to the first longitudinal axis, over a length and, along the first lateral axis, over a height, the height preferably being smaller than two thirds of the length.

14. The device of claim 13, configured such that the height of the set of views is equal, to within less than ±20%, to half its length.

15. A method for displaying a set of views on an image plane, using a displaying device as claimed in claim 1, the method comprising generating an image on the image medium, the generated image being decomposed into elementary images, such that each elementary zone of the image medium generates an elementary image, so that each view, formed on the image plane, corresponds to the projection of pixels of same rank of each elementary zone.

16. The method of claim 15, wherein the pixels of a given elementary zone are configured to display the elementary image, corresponding to the elementary zone, with various brightnesses or various colors.

17. The method of claim 15, wherein the distance between the image medium and the image plane is comprised between 30 cm and 3 meters.

18. The method of claim 15, wherein all of the views extend, in a rectangle, parallel to the first longitudinal axis and to the first lateral axis.

19. The method of claim 18, wherein the rectangle extends:
- parallel to the first longitudinal axis, over a length, which is comprised between 70 mm and 200 mm;
- parallel to the first lateral axis, over a height that is smaller than two thirds of the length.

* * * * *